July 4, 1950
N. A. NELSON
2,513,666
CAMERA FLASH SYNCHRONIZER HAVING INERTIA SWITCH
Filed May 8, 1947
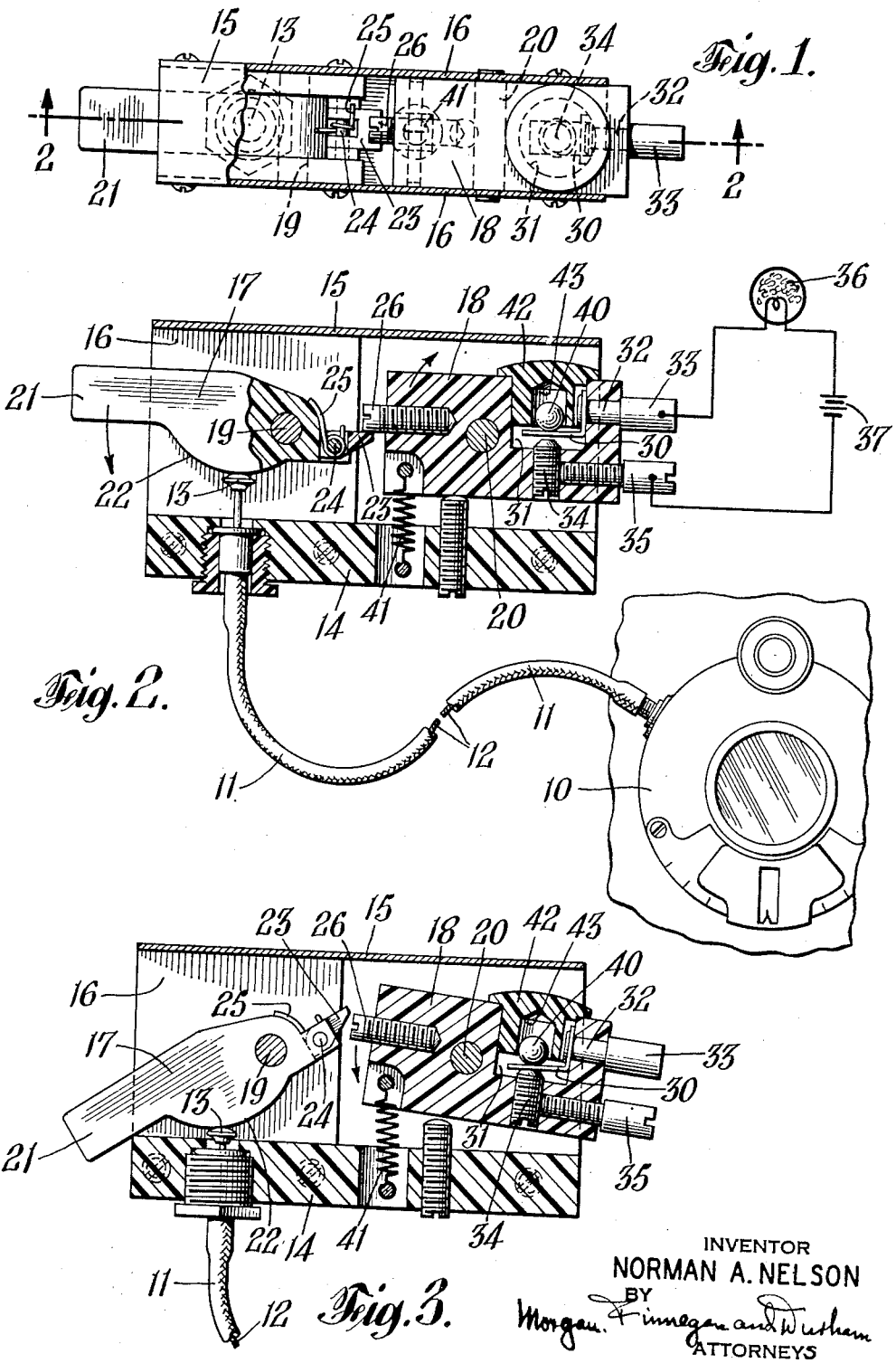
INVENTOR
NORMAN A. NELSON
BY
Morgan, Finnegan and Durham
ATTORNEYS Patented July 4, 1950

2,513,666

UNITED STATES PATENT OFFICE 2,513,666

CAMERA FLASH SYNCHRONIZER HAVING INERTIA SWITCH

Norman A. Nelson, Brooklyn, N. Y., assignor to Norman Nelson Corp., New York, N. Y., a corporation of New York Application May 8, 1947, Serial No. 746,807

7 Claims. (Cl. 95—11.5)

The present invention relates to synchronizing mechanism for cameras to be used when flash bulbs are utilized in taking pictures, and is adapted particularly for use with cameras having so-called "passive" shutter mechanism, that is, shutters which are spring operated by a spring tensioned in the course of a continuous manual exposure movement.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate an embodiment of the invention, and together with the description, serve to explain the principles of the invention.

Of the drawings:

Fig. 1 is a cross-sectional view of a synchronizing mechanism embodying the present invention;

Fig. 2 is a cross-sectional view taken along line 2—2 of Fig. 1 and includes a diagrammatic representation of a circuit for the synchronizing mechanism, flash bulb, and the power unit therefor; and, Fig. 3 is a cross-sectional view corresponding to Fig. 2 showing the elements of the synchronizer in actuated position wherein the ignition switch for flash bulb is closed.

It is an object of the present invention to provide a simple, inexpensive and reliably operating synchronizing mechanism to properly synchronize the shutter operation of a camera with the ignition of a flash bulb so that maximum photographic results may be realized. The synchronizer of the present invention is adapted particularly for use with cameras having passive shutters, but may also be used with active shutters, and may be simply and efficiently added to such cameras as a piece of auxiliary equipment without modifying the camera.

Still another object of the invention is the provision of such synchronizing mechanism which has a minimum of operating parts involving entirely mechanical action so that complications in operation and repair are minimized. The mechanism of the present invention is further capable of minute and easy adjustment to bring about the necessary synchronization between shutter and flash bulb.

With the stated and other objects in view there is provided in an illustrative embodiment of the invention a leaf spring switch in the circuit of the flash bulb and the power supply for igniting it, and a steel ball or other relatively massive object is held in a position with respect to the leaf spring such that the inertia of the ball will close the switch in response to motion given the ball and switch unit. Such switch unit is mounted for pivotal motion to be rotated first in one direction by a pivotally mounted lever and then, falling free thereof, to be rapidly counter-rotated back to a position of rest under the influence of a spring, and the lever is adapted by its pivotal motion in thus rotating the unit to simultaneously bring the passive shutter of a camera to the spring actuated, automatic portion of its operation. In such a camera of a conventional type the shutter is operated by a cable release with which the photographer tensions a spring to actuate the shutter through its opening and closing cycle immediately prior to the exposure, the tensioning and shutter operation taking place as a continuous movement, and the pivotally mounted lever in the synchronizer mechanism is combined with such cable release to operate the latter when the former is manually actuated. Rotation of the lever thus places both the camera shutter and synchronizing switch in positions for automatic operation, and the inertia of the ball in the ensuing rapid counter-rotation of the switch unit is effective to close the switch and ignite the flash bulb. Means are provided for adjusting the pressure necessary to close the switch whereby the ignition of the flash bulb may be minutely adjusted as to time with respect to the opening of the shutter, so that the light peak of the bulb will coincide with the maximum open position of the shutter.

It will be understood that the foregoing general description and the following detailed description as well are exemplary and explanatory of the invention but are not restrictive thereof.

Referring now in detail to the embodiment of the invention shown by way of example in the accompanying drawings, there is illustrated in Fig. 2 the lens and shutter housing 10 of a camera having a passive type shutter which is adapted to be actuated through its opening and closing cycle by the conventional cable release mechanism 11 having cable 12 and push button 13 at the end thereof.

The synchronizing mechanism of the invention comprises a housing having a base or bottom wall 14, a top wall 15, and side walls 16, and within the casing on the side walls are pivotally mounted an actuating lever 17 and a switch unit 18 by means of shafts 19 and 20 respectively. As shown, the actuating lever 17 comprises a portion 21 extending out of the housing to be depressed by the photographer in taking a flash picture, as indicated by the arrow adjacent thereto in Fig. 2, and a cam portion 22 engaging cable release button 13 effective to depress the button and operate the shutter as the lever 17 is pivoted.

The actuating lever 17 further comprises a nose member 23 pivoted thereon by a shaft 24 and biased in a clockwise direction by spring 25, said nose member serving as a contact member to engage under a screw 26 extending outwardly from the switch unit 18 and pivot the latter with pivotal movement of lever 17. After such action the articulated mounting of nose member 23 permits it to resume its position under screw 26 when the members resume their normal positions as shown in Fig. 2.

The synchronizer switch unit 18 comprises an L-shaped leaf spring contact 30 riveted in place in a cavity 31 of the unit block by a conducting member 32 having an enlarged head 33 forming a terminal of the synchronizer switch. The other contact 34 is in the form of a screw extending into cavity 31 and arranged to have its end adjacent but normally spaced from the leaf spring contact 30. The spacing of the contacts may thus be minutely adjusted by rotation of contact 34. A conducting screw member 35 is arranged at right angles to the contact 34 and serves both as a terminal and set screw therefor. As diagrammatically illustrated in Fig. 2 of the drawings, the terminals 33 and 35 of the synchronizer switch unit are connected in series with the flash bulb 36 and its source of power, usually a battery as indicated at 37, in accordance with conventional practice.

The closing of the switch contacts 30 and 34 is brought about by the inertia of a relatively massive member such as a steel ball 40 when the switch unit is rapidly moved from a pivoted position as shown in Fig. 3 of the drawings to its position of rest, as shown in Fig. 2, by action of coiled spring 41 extending between the base 14 of the synchronizer casing and the switch unit 18. As shown, a closure member 42 is provided extending into cavity 31 and having a cylindrical reentrant cavity 43 in which the ball 40 is positioned and guided in motion in line with the contacts 34 and 40.

In the synchronizer mechanism as shown and described for a passive type shutter it will be apparent that from the normal or rest positions of the elements as shown in Fig. 2 the lever 17 may be depressed or rotated in a counterclockwise direction by the photographer to actuate the cable release 11 for the shutter and at the same time pivot the switch unit 18 in a clockwise direction as indicated by the arrows thereon in Fig. 2. When the screw 26 becomes free of the lever nose 23, switch unit 18 will be rapidly rotated in a counterclockwise direction by spring 41, as indicated in Fig. 3 of the drawings, and the inertia of the ball 40 in this accelerating motion riding on contact 30 will close the switch and ignite the flash bulb 36. The stiffness of the leaf spring contact 30 and the mass of ball 40 are so chosen that the ball will not substantially depress the contact when the mechanism is at rest, but will press it against contact 34 upon the rapidly accelerated motion described. A minute adjustment of the switch may be made through switch contact 34, so that the bulb may be ignited at such time that it will reach its illumination peak to correspond with maximum opening of the shutter. It will be noted that the synchronizing mechanism is entirely mechanical in its operation and is constructed of a minimum of parts, removing the complications arising from intricate mechanical and electrical structures heretofore used, and that its operation is effected in a definite and constant relationship with respect to the shutter cycle through lever 17.

The invention in its broader aspects is not limited to the specific mechanisms shown and described but departures may be made therefrom, within the scope of the accompanying claims, without departing from the principles of the invention and without sacrificing its chief advantages.

What I claim is:

1. In a synchronizing mechanism for a camera and flash bulb combination, a pair of normally separated contacts one of which is flexible, an inertia member, said flexible contact being movable into contact with said other contact by said inertia member upon movement of said contacts and member in one direction, pivotally mounted housing means for said contacts and inertia member holding said contacts and inertia member in superposed relationship with the inertia member normally resting on said flexible contact, means for rotating said housing means in one direction to move said contacts and inertia member in a restricted arcuate path about the pivotal axis of said housing means, and other means for automatically rotating said housing means rapidly in the opposite direction in order to close said contacts.

2. In a synchronizing mechanism for a camera and flash bulb combination, a pair of normally separated contacts one of which is flexible, an inertia member, said flexible contact being movable into contact with said other contact by said inertia member upon movement of said contacts and member in one direction, pivotally mounted housing means for said contacts and inertia member holding said contacts and inertia member in superposed relationship with the inertia member normally resting on said flexible contact, pivotally mounted means for engaging and rotating said housing means in one direction for moving said contacts and inertia member in a restricted arcuate path about the pivotal axis of said housing means and disengaging said housing means, and other means for automatically rotating said housing means rapidly in the opposite direction following disengagement in order to close said contacts.

3. In a synchronizing mechanism for a camera and flash bulb combination, a pair of normally separated contacts one of which is flexible, an inertia member, said flexible contact being movable into contact with said other contact by said inertia member upon movement of said contacts and member in one direction, pivotally mounted housing means for said contacts and inertia member, pivotally mounted means for engaging and rotating said housing means in one direction and disengaging said housing means, and other means for automatically rotating said housing means rapidly in the opposite direction following disengagement in order to close said contacts, said pivotally mounted means having a cam surface to engage the cable release of a camera.

4. In a synchronizing mechanism for a camera and flash bulb combination, a pair of normally separated contacts one of which is flexible, an inertia member, said flexible contact being movable into contact with said other contact by said inertia member upon movement of said contacts and member in one direction, pivotally mounted housing means for said contacts and inertia member holding said contacts and inertia member in superposed relationship with the inertia member normally resting on said flexible contact, a pivotally mounted lever having a pivotal nose portion for engaging and rotating said housing means in one direction for moving said contacts and inertia member in a restricted arcuate path about the pivotal axis of said housing means and disengaging said housing means, and spring means for automatically rotating said housing means rapidly in the opposite direction following disengagement in order to close said contacts.

5. In a synchronizing mechanism for a camera and flash bulb combination, a pair of normally separated contacts one of which is flexible, an unsecured inertia member, said flexible contact being positioned between said inertia member and the other said contact, said flexible contact being movable by said inertia member to close said contacts upon movement of said contacts and member in one direction guide means for said inertia member restricting its movement except toward said flexible contact, a pivotally mounted housing for said contacts, inertia member and guide means, a pivotally mounted lever for engaging and rotating said housing means in one direction and disengaging said housing means, and means for automatically rotating said housing means rapidly in the opposite direction following disengagement to close said contacts by said inertia member, said pivotally mounted lever having a cam surface to engage the cable release of a camera.

6. In a synchronizing mechanism for a camera and flash bulb combination, a pair of normally separated contacts one of which is flexible, an unsecured inertia member, said flexible contact being positioned between said inertia member and the other said contact, said flexible contact being movable by said inertia member to close said contacts upon movement of said contacts and member in one direction adjusting means for varying the spaced relationship of contacts, guide means for said inertia member restricting its movement except toward said flexible contact, a pivotally mounted housing for said contacts, inertia member and guide means, a pivotally mounted lever for engaging and rotating said holding means in one direction and disengaging said housing means, and means for automatically rotating said housing means rapidly in the opposite direction following disengagement to close said contacts by said inertia member, said pivotally mounted lever having a cam surface to engage the cable release of a camera.

7. Synchronizing mechanism for a camera having a passive shutter comprising, in combination, a pair of normally separated contacts one of which is flexible, an inertia member, said flexible contact being movable into contact with said other contact by said inertia member upon movement of said contacts and member in one direction, pivotally mounted housing means for said contacts and inertia member, means for rotating said housing means in one direction including a cam portion, means interconnecting said last means and the camera shutter actuated by said cam portion for actuating the shutter thereby, and means for automatically rotating said housing means rapidly in the opposite direction in order to close said contacts.

NORMAN A. NELSON.

REFERENCES CITED

The following references are of record in the file of this patent:

UNITED STATES PATENTS

| Number | Name | Date |
| --- | --- | --- |
| 775,665 | Scott | Nov. 22, 1904 |
| 1,911,621 | Holmgren | May 30, 1933 |
| 1,988,022 | Smith | Jan. 15, 1935 |
| 2,261,953 | Brown | Nov. 11, 1941 |
| 2,439,417 | Castedello | Apr. 13, 1948 |